US009025962B2

(12) United States Patent
Wernlund et al.

(10) Patent No.: US 9,025,962 B2
(45) Date of Patent: May 5, 2015

(54) DEVICE FOR SENDING AND RECEIVING SATA SIGNALS OVER AN OPTICAL FIBER LINK

(71) Applicant: James V Wernlund, Indialantic, FL (US)

(72) Inventors: James V Wernlund, Indialantic, FL (US); Shawn E Karr, Melbourne, FL (US); Tuanc D Diep, Palm Bay, FL (US)

(73) Assignee: James V. Wernlund, Indiatlantic, FL (US)

( * ) Notice: Subject to any disclaimer, the term of this patent is extended or adjusted under 35 U.S.C. 154(b) by 311 days.

(21) Appl. No.: 13/751,319

(22) Filed: Jan. 28, 2013

(65) Prior Publication Data

US 2013/0302037 A1 Nov. 14, 2013

Related U.S. Application Data

(60) Provisional application No. 61/591,240, filed on Jan. 26, 2012.

(51) Int. Cl.
*H04B 10/00* (2013.01)
*H04B 10/25* (2013.01)
*H04B 10/80* (2013.01)

(52) U.S. Cl.
CPC .......... *H04B 10/2503* (2013.01); *H04B 10/801* (2013.01)

(58) Field of Classification Search
CPC ........ H04B 10/40; H04B 10/50; H04B 10/43; H04B 10/2503; H04B 10/516; H04B 10/504; H04B 10/505
USPC ......... 398/140, 141, 158, 159, 164, 135, 136, 398/137, 138, 139, 182, 183, 192, 193, 194, 398/200, 79
See application file for complete search history.

(56) References Cited

U.S. PATENT DOCUMENTS 8,331,792 B2 * 12/2012 Jovanovich et al. .......... 398/140
2011/0008048 A1 * 1/2011 Kim et al. ...................... 398/79

\* cited by examiner

*Primary Examiner* — Hanh Phan
(74) *Attorney, Agent, or Firm* — John L. DeAngelis; Beusse Wolter Sanks & Maire

(57) ABSTRACT

A system for transmitting an optical signal between a host and a device according to a SATA protocol. The system comprises a transmitting-side converter for generating a logic one voltage value responsive to a data one value from an information source, for generating a logic zero voltage value responsive to a data zero value from the information source, for generating an idle state logic voltage value, wherein the idle state logic voltage value is (logic one voltage value+logic zero voltage value)/2, the transmitting-side converter comprising only linear functions to preserve the idle state logic voltage value, and an electrical-to-optical converter for converting the logic one, logic zero and the idle state logic voltage values to an optical signal further comprising respective logic one, logic zero and idle state optical values and for supplying the optical signal to an optical communications medium.

20 Claims, 3 Drawing Sheets

DEVICE FOR SENDING AND RECEIVING SATA SIGNALS OVER AN OPTICAL FIBER LINK

CROSS REFERENCE TO RELATED APPLICATIONS

The present application claims priority under Section 119(e) to the provisional application filed on Jan. 26, 2012 and assigned application No. 61/591,240, which is incorporated by reference herein.

BACKGROUND OF THE INVENTION

IDE (Integrated Device Electronics) is a computer bus interface for connecting a host bus to a mass storage device, such as a hard disk or a CD ROM. The interface provides for bidirectional communications between the bus and the device. The IDE interface is officially referred to as the ATA (AT Attachment) specification. SATA (Serial ATA), which has now replaced the older AT Attachment standard, offers several advantages over its predecessor, including reduced cable size and cost (seven conductors instead of 40, with data communicated over two pairs of conductors), native hot swapping, faster data transfer through higher signaling rates, and more efficient transfer through an (optional) input/output queuing protocol.

However, currently available SATA technology limits transmission of SATA signals to a few meters. This limitation is due primarily to the losses associated with high-speed digital signals on conventional transmission lines. Prior art techniques for extending transmission distance employ retimers and/or distortion equalizers, but even these techniques have limitations. In practice the use of such devices extend the transmission distance only a few meters.

BRIEF DESCRIPTION OF THE FIGURES

The present invention can be more easily understood and the advantages and uses thereof more readily apparent when the following detailed description of the present invention is read in conjunction with the figures wherein.

DETAILED DESCRIPTION OF THE INVENTION

Before describing in detail the methods and apparatuses for sending and receiving SATA signals over an optical fiber link, it should be observed that the present invention resides primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

The present invention relates to extending the transmission distance for a SATA port to as much as 50 km or more using optical fiber as the transmission medium. Additionally use of wavelength division multiplexing (WDM) lasers enables 50 or more SATA channels to be transmitted over a single fiber. The embodiments of the invention presented herein use a linear optical modulator/demodulator to transmit the SATA signal over the fiber. Those skilled in the art recognize that other optical modulators can be used in other embodiments.

Commercially available retimers on both the transmit and receive sides of the link serve as buffers between the host and the optical link at one end and between the device and the optical link at the other end. The retimers essentially regenerate the signal input thereto by correcting the signal magnitude, which may have degraded during transit through the communications medium connecting the host and device. In one application, the present invention uses a first multi-mode optical link for the forward path and second multi-mode optical link for the backward or reverse path.

Figure 1:
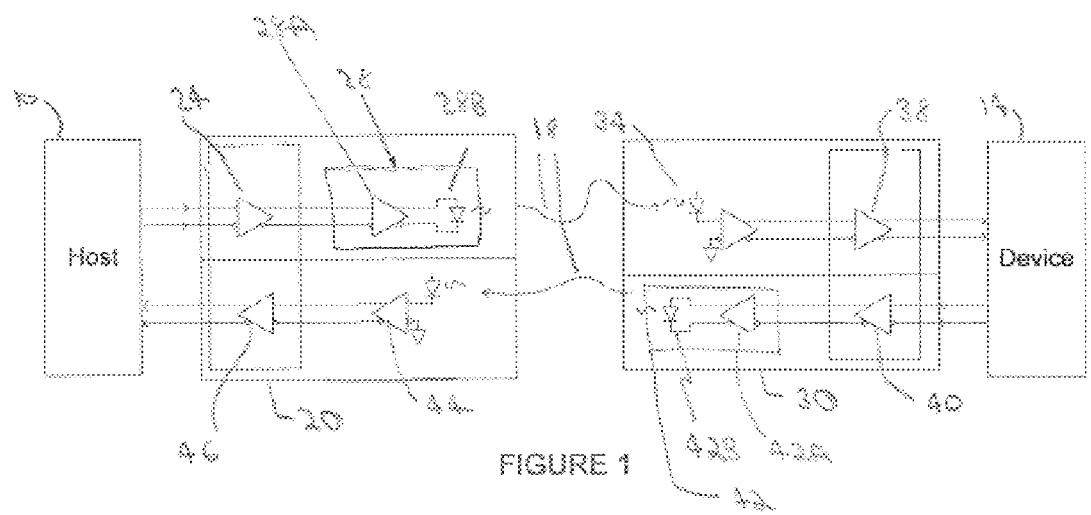
FIG. 1 is a block diagram of the device of the present invention.

FIG. 1 illustrates a host 10 bidirectionally communicating with a device 14 over a fiber link 18. A host-side converter 20 comprises a serial arrangement of a SATA retimer 24 and a linear optical transmitter 28, which produces the optical signal for transmitting over the fiber link 18 to a device-side converter 30. In certain embodiments the linear optical transmitter 28 comprises a serial arrangement of a linear amplifier 28A and an electrical-to-optical converter 28B. The amplifier 28A may be required in those applications where the retimer 24 is not capable of driving the electrical-to-optical converter 28B directly.

The device-side converter 30 comprises (in the receiving path) a linear optical receiver 34 and a SATA retimer 38. A signal from the SATA retimer 38 is supplied as an input to the device 14.

As can be seen from FIG. 1, communications from the device 14 to the host 10 comprises a signal path through a SATA retimer 40, a linear optical transmitter 42, the fiber link 18, a linear optical receiver 44 and a SATA retimer 46. Here also, in certain embodiments the linear optical transmitter 42 comprises a serial arrangement of a linear amplifier 42A and an electrical-to-optical converter 42B. The amplifier 42A may be required in those applications where the retimer 40 is not capable of driving the electrical-to-optical converter 42B directly.

The present invention is employed to generate an optical waveform from the SATA signal to be transmitted from either the host 10 or the device 14. The optical signal is transmitted over the optical fiber link 18 and then converted back to an electrical SATA signal at the receiving end, i.e., either the host or the device. According to the present invention, it is preferred to transmit all states of a SATA signal, i.e., the 1 level state, the 0 level state and the idle state. These states are preserved by using linear transmitters and receivers in both the host-side converter 20 and the device-side converter 30.

The present invention supports SATA links up to 6 Gbits/sec, but the described architecture is not data-rate limited.

The three transmitted states include an optical 1 state, a 0 state and an idle state. The one state and the zero state are standard logic levels and require no special architecture to support optical signaling as there are many devices that support these two states. The DC value of the idle state equals a sum of the DC value of the 1 state and the DC value of the 0 state, with the sum divided by 2. This idle state is supported by linear optical-to-electrical and linear electrical-to-optical converters as depicted in FIG. 1. When the differential signal of the idle state is transmitted it is equivalent to the average power of the optical signal.

This technique can be implemented in hardware according to at least two different embodiments. The idle state can be generated directly from the single-ended signal Q or Q-bar state, or it can be generated from the differential signal by modulating the laser diode 28B/42B differentially. Note that by using a linear modulator the idle state is preserved.

Figure 2:
FIG. 2 illustrates transmitted data pulses as sent and received by the device of FIG. 1.

FIG. 2 illustrates the data states for both the electrical and optical signals.

Typical optical modulators, such as those used in SONET or data communication devices, include a limiter in both the transmitter and receiver. This limiter destroys the idle state, prohibiting establishment of a SATA link. A linear modulator/receiver preserves the idle state.

One embodiment of the invention addresses the design of a SATA link using an 850 nanometer VCSEL laser, but any light-source diode that supports the data rate and linear modulation will function properly, including LED's and distributed feedback lasers (DFB's).

Two data paths are required to support the SATA protocol, a forward path and a backward or reverse path. Circuitry at both ends of the paths is typically identical, i.e., receiving circuitry at both ends and transmitting circuitry at both ends. Additionally, in one embodiment two identical paths with two dedicated fibers are used to support the forward and backward paths, e.g., such as the two paths designated by reference numeral 18 in FIG. 1. Another embodiment uses a single fiber with two colors (wavelengths) traveling in different directions to support bidirectional communication.

Figure 3:
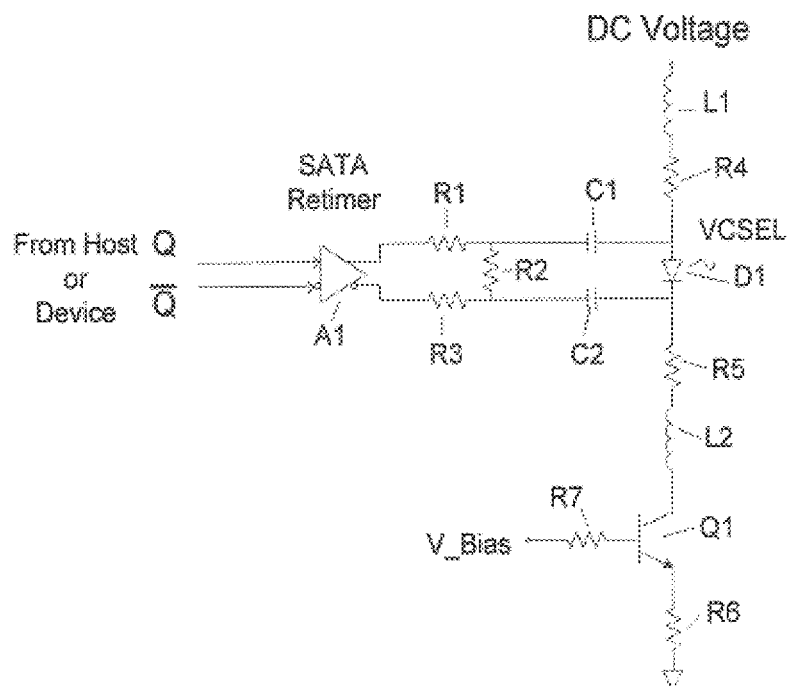
FIG. 3 is a schematic diagram of a SATA data transmitter according to the present invention.

FIG. 3 illustrates the transmitter side of the optical link. Component A1 is a linear laser driver. In this case a SATA retimer is used as the linear laser driver as it has sufficient drive capability for driving a VCSEL. Diode D1 is the VCSEL laser diode. Resistors R1, R2, and R3 comprise a matching network used to match the laser driver output impedance to the laser input impedance. Capacitors C1 and C2 are DC blocking capacitors for isolating the idle state DC voltage developed across the diode D1 from the A1 outputs.

When the Q and Q-bar outputs are equal (idle state) there is no modulation current and the output of the VCSEL laser is established by the DC bias value set by a transistor Q1. Resistors R6 and R7 with transistor Q1 and a V_bias voltage form a constant current source. The current source output represents the transmitted value of the idle state. Its value is approximately (1 state level+0 state level)/2.

When a transition occurs between a binary one and a binary zero, there is a period when the Q and the Q-bar outputs must be equal. The Q output is transitioning from the one value to the zero value and the Q-bar is transitioning from the zero value to the one value or visa versa. Thus there is a value for Q and Q-bar, which if held constant results in the two outputs being equal. In a linear system this input value is exactly (0+1)/2, the (1, 0) threshold value.

The DC restore loop (to be described below) in the receiver adjusts the threshold to a level (0+1)/2. The DC bias injected into the laser diode D1 at the transmitter is that threshold, i.e., the value at which the receiver outputs Q and Q-bar are equal. We are thus essentially transmitting the receiver (1, 0) threshold value. This works because in a binary 1, 0 AM system the average value is exactly (0+1)/2, i.e., the threshold value. This does not upset the receiver threshold loop as the average value is transmitted during the idle state, which is the value the receiver is trying to adjust its threshold to. The DC restore loop does not know the difference between an AM modulated binary signal and a DC signal at the threshold value. When the input to the receiver is at the threshold value both the Q and the Q-bar outputs are equal, not a one nor a zero, but half way between these values.

Note that the laser output and the receiver input are DC coupled. This is a requirement in one embodiment as the optical signal is not differential but single-ended with three stable values 1, 0, and (1+0)/2. When dealing with a differential signal, the DC value becomes irrelevant, i.e., the value of the threshold is (1+0)/2+(any constant). Thus any constant enables the AC coupling of the electrical differential outputs.

In the receiver, this DC value is the value which forces the Q and the Q-bar outputs of the receiver to be equal (i.e., the idle state).

Resistors R4 and R5 and inductors L1 and L2 in FIG. 3 form a high impedance bias network.

Figure 4:
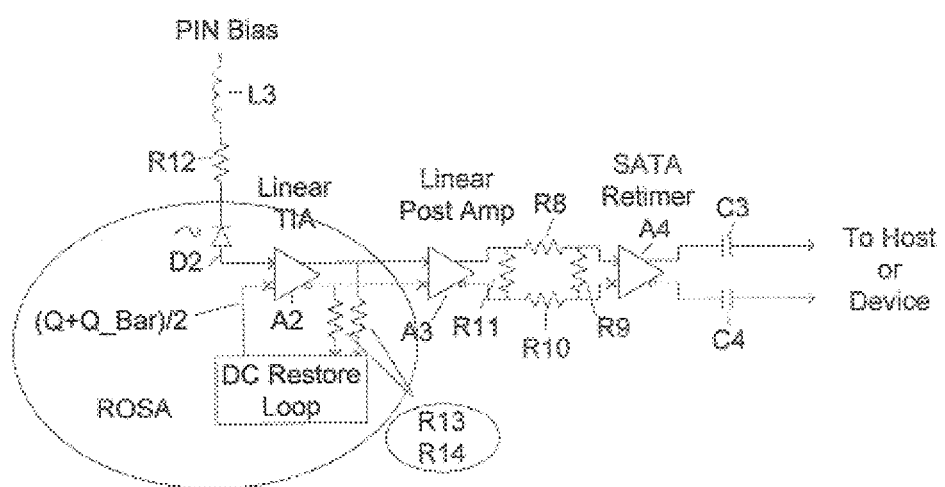
FIG. 4 is a schematic diagram of a SATA data receiver according to the present invention.

FIG. 4 details the receiver side of the optical link. There are three gain stages in this receiver embodiment, each providing a different function. The first stage comprises a linear optical-to-electrical converter followed by a linear TIA (trans-impedance amplifier). The second stage comprises a linear gain stage (linear post amplifier) used to compensate for losses. The third stage is a SATA retimer.

The first stage provides the optical-to-electrical trans-impedance amplifier function and is contained within a ROSA (Receiver Optical Sub-Assembly). D2 is a PIN receiver diode and amplifier A2 comprises the TIA. L3 and R12 form a bias network for the diode D2.

The ROSA design comprises a DC restore loop. This loop sets the DC value of the recovered signal to approximately (level 1 state plus level 0 state)/2, which is the DC level of the transmitted idle signal. The DC restore loop forces the transition point between the 1 level and the 0 level as seen by the TIA input to be at (1+0)/2. At this point the outputs of the TIA Q and Qbar are equal for a linear TIA. If the input signal is slightly greater than the DC level, the Q output will be slightly greater than the Qbar output and if the input signal is slightly less than the DC level, the Q output will be slightly less than the Qbar output. A limiting TIA forces the Q output to the 1 level for a very small signal increase above the DC level and forces the 0 level for a very small decrease below the DC level, thus destroying the idle state. Note that the idle state is defined as the state where Q and Qbar are within 50 mV of each other. A retimer squelches the outputs and forces them to be equal when Q and Qbar at its inputs are within 50 mv for more than 100 nsec. The retimers enable the use of cabling between the optical link and the host at one end or the optical link and the device at the other end.

In one embodiment a retimer is not needed if the optical device is plugged directly into the host or device, as they have internal retimers to regenerate the signal magnitudes.

This loop functions as described even when there is no data at the input as the idle state is by design (1 level state+0 level state)/2.

Amplifier A3 provides a linear gain, which may be needed to increase the levels of the received optical signal to a sufficiently high value for input to the retimer A4. The amount of gain needed is a function of the distance the optical signal has been transmitted and the medium the optical signal is transmitted through, i.e. multi-mode fiber, single mode plastic optical fiber or some other fiber type, since these factors influence the magnitude of the received optical signal.

Resisters R8, R9, R10 and R11 form an attenuator pad for matching the linear post amplifier output impedance to the input impedance of the SATA retimer A4.

Capacitors C3 and C4 couple the retimer A4 to the transmission line to the receiving host or device.

The encoding of a SATA signal (8B10B) ensures the DC level is (1+0)/2 in the transmitted data, which allows the electrical devices to be capacitively coupled and it ensures a transition density of 50% within a very small number of bit times (e.g., 10 bits). 8B10B encoding generates 10 bits from 8 information bits. If this were not the case the DC restore loop within the ROSA linear trans-impedance amplifier would track the long strings of 1's or 0's and not preserve the idle state.

8B10B encoding is used in data communications. Telecommunications equipment uses other schemes to ensure a 50% transition density, but over much longer strings of 1's or 0's (e.g., 100 bits). Additionally telecommunications equipment does not have a third state used for idle. Instead it actually uses idle patterns of 1's and 0's to ensure a 50% transition density, which ensures that there is no DC level in the final output from SATA retimer A4. This suggests use of a retimer in a telecommunications system.

The retimer regenerates the idle state by looking at the Q and the Qbar inputs. When they are within 50 mV of each other it forces the idle state on the output. A retimer does not know the difference between low level 1 0 signaling and the idle state. Therefore the designer of the SATA link can select the DC values in the link. Within the optical portion of the link the DC value must be (1+0)/2. In the described embodiment the DC value is the idle state. An integrated circuit or another device in the SATA link may offset the DC value by a constant, but the idle state will not be affected. That is, consider the equation presented above with a DC offset:

((1 state+DC offset)+(0 state+DC offset))/2 will function properly because the system is AC coupled, i.e., the actual level of the DC is not transmitted. Only transitions to the DC level of the 1 state and transitions to the 0 state are transmitted.

Returning to FIG. 4, inductor L3 and resistor R12 form the bias network for the PIN diode D2.

Figure 5:
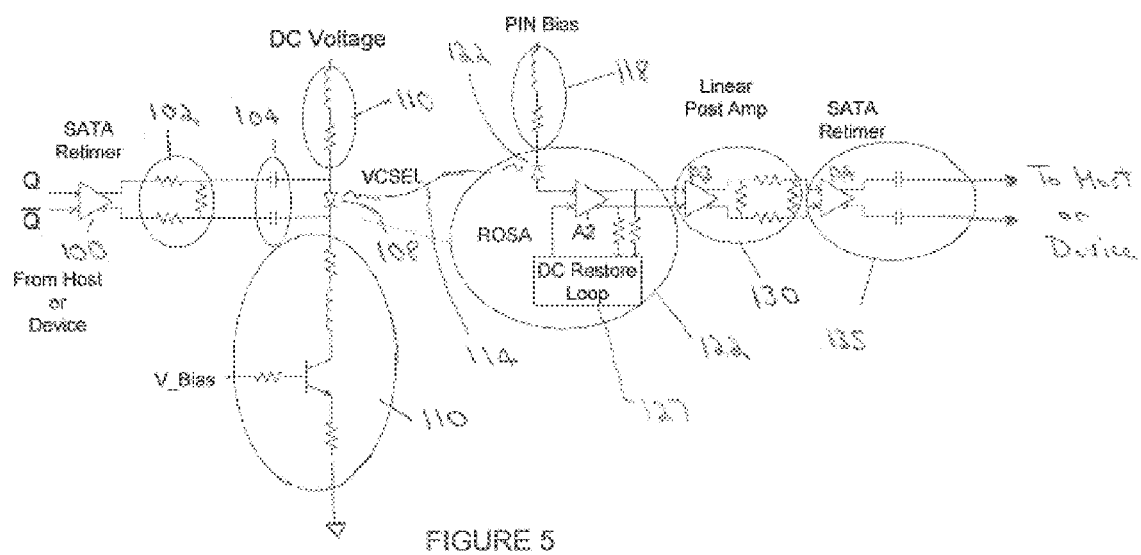
FIG. 5 is a schematic diagram of both a SATA data receiver and transmitter according to the present invention.

FIG. 5 illustrates components associated with the signal flow in one direction over the SATA link of the present invention. The device link is identical to the host link. In this embodiment a separate fiber is used for the host and device transmit/receive links, but this is not required. In practice there is no technical reason why a single fiber cannot be used to provide both the forward and backward links. This situation can be accommodated by using DWDM lasers and inserting filters, circulators or directional couplers into the link to provide the necessary isolation between the transmitters and receivers. Additionally if a low cost consumer solution is desired, the forward and backward links can be implemented using LED's in the visible spectrum.

Element 100 is a SATA retimer. In this case it is used to receive the host or device electrical data signal and to generate the one and zero levels of the SATA transmitted signal. In applications where a VCSEL is used as the laser diode, there is sufficient drive output from the retimer to drive the laser directly. In other applications it may be necessary to use a linear laser driver as the required drive currents for a distributed feedback laser (DFB), for example, are significantly higher.

Element 102 is a resistor matching network. This network is used to match the output impedance of the retimer 100 to the input impedance of a VCSEL laser 108.

Element 104 comprises two coupling capacitors. The coupling capacitors block the DC bias of the retimer and enable a separate DC bias to be injected into the laser.

In one embodiment the laser 108 is a 850 nm VSCEL, but the solution detailed here can include any optical source capable of supporting the desired modulation rate. The described solution supports 1, 3 and 6 GB SATA links.

Element 110 comprises components that provide a DC bias for the laser 108, which is transmitted as the idle state for the link.

The optical fiber link is designated with reference numeral 114. In one embodiment the link 114 comprises a 850 nm multi-mode fiber. The design is not limited to any particular fiber type and the type of link utilized is a function of the distance the link needs to support and the complexity of the hardware design. The link can also be implemented using plastic optical fiber or single mode fiber. There is no particular limit to the link length from an implementation standpoint.

Element 118 is a bias network for providing a DC bias for the receiver PIN diode 122. It provides the reverse bias needed to support the diode required bandwidth. This embodiment uses a PIN diode but for increased transmission distances an APD (Avalanche Photo Diode) can be used as well.

Element 122 comprises the ROSA sub-assembly. Within the ROSA is a linear TIA A2 and a DC restore loop 127.

Element 130 comprises a linear post-amplifier. There are no special design features associated with the element 130 other than it cannot have an AGC loop or a limiter. A limiter would produce a logic one level output voltage when the input is above a predetermined threshold value and produce a logic zero level output voltage when the input is below a predetermined threshold. Further, these threshold values are defined as (logic 1 value+logic 0 value)/2. Clearly such a limiter operation destroys the idle state value and thus use of a limiter is to be avoided.

An AGC loop increases the gain of the amplifier when in the idle state, and a limiting TIA destroys the idle state. Thus neither can be used according to the present invention.

Element 135 is a retimer. The retimer buffers the linear amplifier 130 from the transmission line and regenerates the transmitted electrical signal. Note that the retimer output is designed to generate an electrical signal consistent with the SATA specification.

Although the invention has been shown and described with respect to a certain preferred embodiment or embodiments, it is obvious that equivalent alterations and modifications will occur to others skilled in the art upon the reading and understanding of this specification and the figures. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A system for transmitting an optical signal between a host and a device according to a SATA protocol, the system comprising:

a transmitting-side converter for generating a logic one voltage value responsive to a data one value from an information source, for generating a logic zero voltage value responsive to a data zero value from the information source, for generating an idle state logic voltage value, wherein the idle state logic voltage value is (logic one voltage value+logic zero voltage value)/2, the transmitting-side converter comprising only linear functions to preserve the idle state logic voltage value; and an electrical-to-optical converter for converting the logic one, logic zero and the idle state logic voltage values to an optical signal further comprising respective logic one, logic zero and idle state optical values and for supplying the optical signal to an optical communications medium.

2. The system of claim 1 further comprising an optical receiver for receiving the logic one, logic zero and idle state optical values from the system via the optical communications medium.

3. The system of claim 2 wherein the optical communications medium comprises a fiber link, the fiber link further comprising one of a single channel optical link and a multimode optical link.

4. The system of claim 2 wherein the system is disposed within the host and the optical receiver is disposed within the device and comprises a device-side converter, further comprising a serial arrangement of a SATA retimer and a linear optical receiver.

5. The system of claim 2 wherein the optical receiver comprises a serial arrangement of a trans-impedance amplifier, a linear post amplifier, and a SATA retimer.

6. The system of claim 2 wherein the optical receiver comprises a DC restore loop providing the DC voltage level of the idle state.

7. The system of claim 1 wherein the transmitting-side converter further comprises a serial arrangement of a SATA retimer and a linear amplifier that drives the electrical-to-optical converter.

8. The system of claim 1 wherein the transmitting-side converter further comprises a SATA retimer that drives the electrical-to-optical converter.

9. The system of claim 1 wherein the idle state optical value is generated directly responsive to the logic one and logic zero voltage values.

10. The system of claim 1 wherein the idle state optical value is generated differentially from the logic one and logic zero voltage values.

11. The system of claim 1 wherein the electrical-to-optical converter comprises a laser diode.

12. The system of claim 1 wherein the idle state logic voltage comprises a DC bias voltage.

13. A system for bidirectionally transmitting an optical signal between a first apparatus and a second apparatus according to a SATA protocol, the system comprising:

within the first apparatus;
   a transmitting converter for generating a logic one voltage value responsive to a data one value, for generating a logic zero voltage value responsive to a data zero value, and for generating an idle state logic voltage value, wherein the idle state logic voltage value is (logic one voltage value+logic zero voltage value)/2, the first transmitting converter comprising only linear functions to preserve the idle state logic voltage value;
   an electrical-to-optical converter for converting the logic one, logic zero and the idle state logic voltage values to an optical signal further comprising respective logic one, logic zero and idle state optical values;
an optical communications medium for receiving the optical signal from the first electrical-to-optical converter and for propagating the optical signal;
within the second apparatus;
   an optical-to-electrical converter for receiving the optical signal from the optical communications medium and for converting the logic one, the logic zero and the idle state optical values to respective logic one, logic zero and idle state voltage values; and
   a receiving converter for receiving the logic one, logic zero and idle state logic voltage values and for generating a data signal further comprising a one logic data value responsive to a logic one voltage value and for generating a logic zero data value responsive to a data zero voltage value.

14. The system of claim 13 wherein the optical communications medium comprises a fiber link, the fiber link further comprising one of a single channel optical link and a multimode optical link.

15. The system of claim 13 wherein the transmitting converter further comprises a serial arrangement of a SATA retimer and a linear amplifier that drives the electrical-to-optical converter.

16. The system of claim 13 wherein the transmitting converter further comprises a SATA retimer that drives the electrical-to-optical converter.

17. The system of claim 13 wherein the electrical-to-optical converter comprises a laser diode.

18. The system of claim 13 wherein the idle state logic voltage comprises a DC bias voltage.

19. The system of claim 13 wherein the receiving converter comprises a serial arrangement of a trans-impedance amplifier, a linear post amplifier, and a SATA retimer.

20. The system of claim 13 wherein the receiving converter comprises a DC restore loop providing the DC voltage level of the idle state.

* * * * *